Sept. 4, 1951 H. TREVASKIS 2,566,708
ELECTRICALLY OPERATED DEVICE FOR THE CONTROL
OF FLUID PRESSURE SERVOMOTORS
Filed Dec. 31, 1946 2 Sheets-Sheet 2
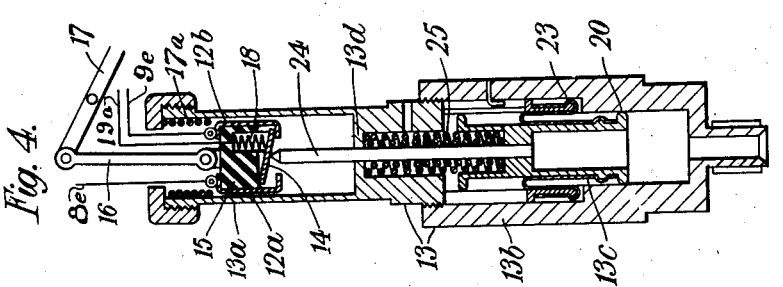
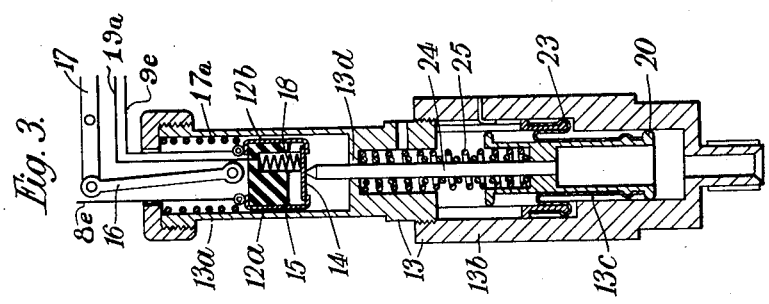
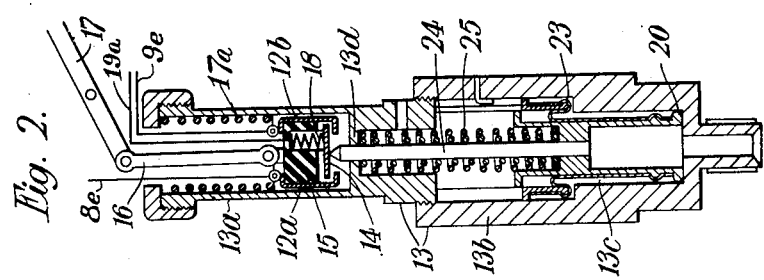
Inventor
Henry Trevaskis
by Benj. T. Rauber
his attorney Patented Sept. 4, 1951

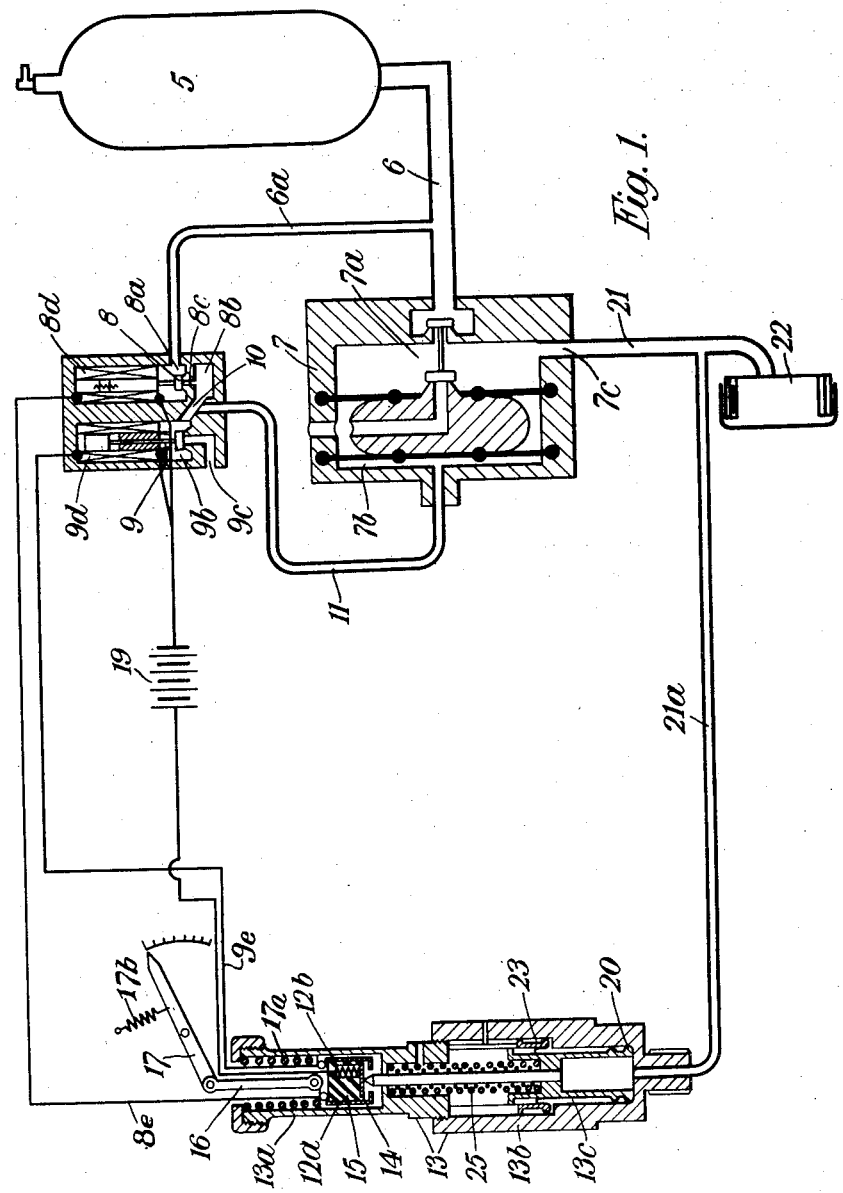

2,566,708

UNITED STATES PATENT OFFICE 2,566,708

ELECTRICALLY OPERATED DEVICE FOR THE CONTROL OF FLUID PRESSURE SERVO-MOTORS

Henry Trevaskis, Solihull, Birmingham, England, assignor to Dunlop Rubber Company Limited, London, England, a British company Application December 31, 1946, Serial No. 719,521
In Great Britain December 22, 1945

Section 1, Public Law 690, August 8, 1946
Patent expires December 22, 1965

11 Claims. (Cl. 121—41)

My invention has reference to an improved apparatus for controlling the supply of fluid to a closed container with especial reference to apparatus for controlling the supply of fluid to fluid actuated brake operating means for the landing wheel brakes of aircraft.

With some types of aircraft it is desirable that the length of the fluid transmission lines should be as short as possible and that the speed of "build up" of the braking pressure should be as great as possible in order to avoid lag.

The present invention has for its primary object to provide an improved apparatus for controlling the supply of fluid to fluid actuated brake operating means which enables the said desiderata to be obtained, and which in addition is sensitive in operation and which admits of an accurate control of the braking pressure.

According to the invention an improved apparatus for controlling the supply of fluid from a source of supply to a closed container comprises an inlet valve for permitting the flow of fluid from the source of supply to the said container, electro-magnetic means for opening the said valve, and a pressure-selecting device for controlling the supply of electric current operating the said electro-magnetic means, which said device is responsive to the fluid pressure in the said container and operates automatically to cut off the current to the said electro-magnetic means when the said pressure reaches a predetermined value whereby the said inlet valve is closed and the fluid supply to the said container is cut off.

The invention also resides in the improved fluid actuated brake operating means to be described hereinafter.

An embodiment of the invention will now be described with particular reference to the accompanying drawings which illustrate the invention in its application to a fluid actuated brake operating means for the landing wheels of aircraft utilising a fluid relay as described and claimed in our prior British Patent Specification No. 560,201.

In the drawings:

Figure 1 is a diagrammatic view, mainly in section illustrating the general lay out of a fluid actuated brake operating means for the landing wheels of aircraft in accordance with the embodiment aforesaid and Figures 2, 3 and 4 are views on an enlarged scale and in section showing three positions of the control device utilised in the arrangement illustrated in Figure 1.

As illustrated in the drawings, the improved brake operating means incorporates a source of fluid pressure 5 which is in communication by way of a pipe line 6 with the main inlet chamber 7a of a fluid relay 7 which has been stated already is constructed in accordance with the invention described and claimed in our prior British Patent Specification No. 560,201 but which relay is only shown diagrammatically in Figure 1 of the present drawings.

The pipe line 6 has a by-pass connection by way of a pipe line 6a with a chamber 8a which is in communication with a chamber 8b by way of a passage 8c controlled by an electro-magnetically operated valve 8, said valve being referred to hereinafter as the electro-magnetic inlet valve 8.

The chamber 8b is in communication with a chamber 9b which in turn is in communication with the atmosphere by way of a passage 9c controlled by a second electro-magnetically operated valve 9 which will be referred to hereinafter as the electro-magnetic exhaust valve 9.

The chambers 8b and 9b are interconnected by a passage 10 which is in communication by way of a pipe line 11 with the balancing pressure side 7b of the fluid relay 7.

The valves 8 and 9 are actuated by solenoids 8d and 9d respectively, the valve 8 being open when the solenoid 8d is energized and, conversely, the valve 9 being closed when the solenoid 9d is energized. When both solenoids are energized, therefore, valve 8 is open and valve 9 closed and fluid is supplied; when both solenoids are de-energized, valve 8 is closed and valve 9 open, and the system is exhausted. When solenoid 9d is energized and solenoid 8d de-energized both valves are closed and pressure is held static in the system. Both valves are not open simultaneously.

The solenoids 8d and 9d respectively of the electro-magnetic inlet and exhaust valves 8 and 9, are electrically connected by lead 8e and 9e with arcuate contacts 12a, 12b contained within a control housing which is formed of two interconnected parts 13a, 13b and which is located adjacent to the operator. The contacts 12a, 12b are L-shaped in cross-section and have their horizontal limbs extending toward each other but spaced to form a gap which may be spanned by a contact disc 14 which may rest and be supported on the opposed horizontal limbs. The contacts are mounted on opposite sides of a control plunger 15 of insulating material and extend below its lower face to form a space in which the disc 14 may rise from the contacts 12a and 12b. The plunger 15 is connected by means of a link 16 to a setting lever 17 under the control of the operator. The plunger 15 is normally pressed downwardly by a coil spring 17a confined between the upper face of the plunger and the top plate of the housing 13a. The control or setting lever 17 may be similarly moved by a spring 17b, Fig. 1.

The control plunger 15 has mounted therein eccentrically a vertically arranged spring 18 which is always in electrical connection with the contact disc 14 aforesaid and with the source of electric supply 19 through a lead 19a. The source of electric supply 19 also is in electrical connection with the solenoids 8d and 9d of the electro-magnetic inlet and exhaust valves 8 and 9.

As will be seen from an examination of Figures 2, 3 and 4 the contact disc 14 can assume three positions. In Figure 2 the contact disc 14 has been pushed against the lower face of the plunger 15 and out of contact with both of the horizontal limbs of the L section contacts 12a, 12b so that the circuits through both the solenoids 8d, 9d are broken. In Figure 3 the contact disc 14 is in contact with both of the horizontal limbs of the contacts 12a, 12b aforesaid so that the circuits through both the solenoids 8d, 9d are completed whilst as shown in Figure 4 the contact disc 14 is out of contact with the horizontal limb of the contact 12a but is pressed by the spring 18 into contact with the horizontal limb of the contact 12b so that the circuit through the solenoid 9d is completed but the circuit through the solenoid 8d is broken.

The arcuate electrical contacts 12a, 12b and the control plunger 15 are contained within the upper part 13a of the control housing 13, the lower portion 13b of which contains a hollow piston 20 contained within a cylinder 13c which is in communication by way of a pipe line 21a with a pipe line 21 leading from the outlet 7c from the fluid relay 7 to the brake applying means 22 which is of a known kind, said piston 20 being called hereinafter the pressure balancing piston 20. This pressure balancing piston 20 is associated with a diaphragm 23 for ensuring a fluid tight operation.

Projecting from the upper side of the pressure balancing piston 20 is the lower end of a rod 24, the upper end of which is of conical formation and is disposed adjacent to the centre of the underside of the contact disc 14 referred to hereinbefore. Arranged around the said rod is a compression spring 25, one end of which abuts an intermediate flange 13d within the upper part 13a of the control housing whilst the other end of the said spring 25 is disposed within and in abutment with the bottom of a recess in the upper portion of the pressure balancing piston 20. The spring 25 tends to force the pressure balancing piston 20 towards the closed end of the cylinder 13c.

The electrical circuit is such that when the circuits through the solenoids 8d and 9d of the electro-magnetically operated inlet and exhaust valves 8 and 9 are completed the electro-magnetic inlet valve 8 is caused to open whilst the electro-magnetic exhaust valve 9 is caused to close.

The solenoids 8d, 9d of the electro-magnetic inlet and exhaust valves 8 and 9 are continuously rated and have a current consumption of the order of 0.1 ampere per hour.

The operation of the invention is as follows:

When it is desired to carry out a braking operation the operator adjusts the setting lever 17 to give the desired degree of braking pressure required and this movement of the setting lever 17 through the link 16 raises the control plunger 15 in the upper part 13a of the control housing and so enables the contact disc 14 to make contact with both of the horizontal limbs of the L section contacts 12a, 12b. This completes the circuit through the solenoids 8d, 9d of the electro-magnetic inlet and exhaust valves 8 and 9 so occasioning the electro-magnetic inlet valve 8 to open and the electro-magnetic exhaust valve 9 to close.

The opening of the electro-magnetic inlet valve 8 enables pressure from the supply 5 to pass by way of the bye-pass 6a through the chambers 8a, 8b to the balancing pressure side 7b of the fluid relay 7 where it builds up pressure and causes the delivery valve of the relay to open and the exhaust valve to close so that the fluid pressure passes to the brake applying means 22.

The pressure applied to the brake applying means 22 also reacts on the pressure balancing piston 20 and moves the said piston 20 in an upward direction in the cylinder 13c in the lower portion 13b of the control housing until the upper end of the rod 24 reaches the contact disc 14, and as this disc 14 is spring loaded "off centre," the said disc 14 tilts and breaks the circuit through the solenoids 8d of the electro-magnetic inlet valve 8 only, the circuit through the solenoid 9d of the electro-magnetic exhaust valve 9 remaining completed. Consequently as the air supply is now cut off, the braking pressure which has been attained can be maintained as long as desired.

When it is required to release the brakes, the movement of the setting lever 17 to the "off" position causes the downward movement of the control plunger 15, thereby breaking the circuit through the solenoid 9d of the electro-magnetic exhaust valve 9 which in consequence opens and releases the pressure from the fluid relay as described in the aforesaid British Patent Specification No. 560,201.

It will be understood that the operating lever 17 may be set so that brakes may be applied for "parking purposes."

It will be appreciated that with brake operating means as hereinbefore described the majority of the components can be built into close proximity with the brake units so that the only outside connections required are one small bore pipe 21a leading to the control housing and three small capacity electrical leads two of which connect the contacts 12a, 12b in the control housing with the solenoids 8d, 9d of the electro-magnetic inlet and exhaust valves and the other of which electrically connects the disc 14 with the source of electric supply 19.

In addition it will be appreciated that braking pressure is built up substantially instantaneously and that pressure control is accurate and sensitive.

Although the invention has been described in its application to and is intended primarily for the actuation of fluid operated aircraft brakes it is to be understood that the invention may also be applied to the actuation of fluid operated vehicle brakes and to other apparatus for controlling the supply of fluid to a closed container.

Further it will be understood that, if desired, means may be provided for mechanically connecting the control piston 15 to the rudder mechanism of the aircraft or to the steering mechanism of the vehicle so as to provide for differential operation.

Having described my invention, what I claim is:

1. Electrically operated device for the control of pressure fluid which comprises a housing, fluid relay supply and delivery conduits connected to said housing, actuating and release valves in said housing controlling the admission of fluid to, and exhaust from, said delivery conduit, a movable wall in said housing controlling said actuating and release valves and dividing said housing into a chamber communicating with said delivery conduit and a pressure balancing chamber, an electric circuit having a pair of parallel branch circuits, an electro-magnetically operated inlet valve actuated by one branch circuit to admit pressure fluid to said pressure balancing chamber, an electro-magnetically operated exhaust valve actuated by the other of said branch circuits to exhaust pressure fluid from said pressure balancing chamber, a manually movable pair of arcuate contact strips, one for each of said branch circuits and having inturned ends, a displaceable contact disc connected to a source of electric energy and spring pressed into contact with said inturned ends of said contact strips, a pressure selecting member for displacing said contact disc successively from one of said strips and then from both strips and comprising a plunger movable in the direction of manual movement of said pair of contact strips and actuated by the pressure of fluid in said delivery conduit to contact said disc at a point nearer one of said strips than the point of spring pressure thereon and to lift said disc.

2. The device of claim 1 in which said plunger contacts the center of said disc and the spring pressure is applied eccentrically thereto.

3. Apparatus for controlling the pressure of fluid in a pressure applying system which comprises an inlet valve to said system, an exhaust valve from said system, an inlet electric circuit comprising an electro-magnet to open said inlet valve when energized, an outlet electric circuit comprising an electro-magnet to close said outlet valve when energized, and a switch movable to close both said circuits and comprising a pair of terminals, one for said inlet circuit and the other for said outlet circuit, a contact connected to a source of electric energy spring pressed into contact with both said terminals, a progressively movable means in said system to move said contact away from said terminals against the action of said spring to move said contact first from said terminal of said inlet electric circuit and then from both said terminals.

4. The apparatus of claim 3 in which said terminals are movable toward or from said spring pressure of said contact.

5. The apparatus of claim 3 comprising a relay actuated by the pressure in said system and in which said contact is moved away from said terminals by the pressure in said relay.

6. The apparatus of claim 5 in which said terminals are movable toward or from the direction of pressure on said terminal.

7. Apparatus for controlling the pressure of fluid in a pressure-applying system which comprises an inlet valve to said system, an electromagnet to open said valve when energized, an exhaust valve from said system, an electromagnet to close said exhaust valve when energized, an electric circuit connecting said electromagnets in parallel, a switch movable manually to close the circuit through both said electromagnets, said switch comprising a pair of terminals and a contact spring-pressed against both said terminals, and means movable progressively by increasing pressure in said pressure applying system to move said contact away from said terminals against the action of said spring and having its point of pressure off-set from said spring to move said contact first from the inlet terminal of said circuit and then from both of said terminals.

8. The apparatus of claim 7 in which said terminals are movable manually toward or from said pressure movable means.

9. Apparatus for controlling the supply of fluid under pressure in a system comprising a solenoid operated inlet valve, a solenoid operated exhaust valve, a pressure-selecting device having a manually operated plunger, a pair of electrical contacts in the form of strips which move with the plunger and which have inwardly turned ends, one of said contacts being in circuit with the inlet valve solenoid and the other contact being in circuit with the exhaust valve solenoid, a device responsive to the pressure within said system and a displaceable contact make-and-break means in the form of a disc of conductive material adapted to bridge the gap between the inwardly turned ends of said electrical contacts.

10. Apparatus of claim 9 comprising spring means located eccentrically relative to said disc, said disc being tiltable upon application of pressure to the center thereof to break contact with the electrical contact connected to the inlet valve solenoid whilst still maintaining contact with the electrical contact connected to the exhaust valve solenoid.

11. The apparatus of claim 9 comprising a projecting portion associated with said pressure responsive device to exert pressure on the disc for effecting a tilting or a complete lifting of the disc, depending on the movement of the plunger and the displacement of the pressure responsive device.

HENRY TREVASKIS.

REFERENCES CITED

The following references are of record in the file of this patent:

UNITED STATES PATENTS

| Number | Name | Date |
|---|---|---|
| 1,496,953 | Stewart | June 10, 1924 |
| 1,823,225 | Wright | Sept. 15, 1931 |
| 1,878,822 | Dewandre | Sept. 20, 1932 |
| 2,091,043 | Hewitt | Aug. 24, 1937 |
| 2,113,621 | Kershaw | Apr. 12, 1938 |
| 2,170,240 | Fitch | Aug. 22, 1939 |
| 2,219,062 | Almond | Oct. 22, 1940 |

FOREIGN PATENTS

| Number | Country | Date |
|---|---|---|
| 412,756 | Great Britain | July 5, 1934 |